No. 838,612. PATENTED DEC. 18, 1906.
F. W. FELSBERG.
VALVE GUARD.
APPLICATION FILED JULY 31, 1905.

Witnesses:
George J. Schwartz.
Fred J. Kinsey.

Inventor:
Frederick W. Felsberg.
By
Chas. E. Lord
Attorney.

UNITED STATES PATENT OFFICE.

FREDERICK W. FELSBERG, OF DAYTON, KENTUCKY, ASSIGNOR TO THE TRIUMPH ICE MACHINE COMPANY, OF CINCINNATI, OHIO.

VALVE-GUARD.

No. 838,612.      Specification of Letters Patent.      Patented Dec. 18, 1906.

Application filed July 31, 1905. Serial No. 271,952.

*To all whom it may concern:*

Be it known that I, FREDERICK W. FELSBERG, a citizen of the United States, residing at Dayton, in the county of Campbell and State of Kentucky, have invented certain new and useful Improvements in Valve-Guards, of which the following is a full, clear, and exact specification.

My present invention relates to improvements in the construction of valves for air or gas compressors.

In gas-compressors, and particularly in ammonia-compressors, such as are employed in ice-making machinery, quite disastrous results have accompanied the accidental breaking or injuring of the spring or spindle of one of the valves to such an extent as to permit said valve to fall into the compressor-cylinder. A number of different means have been suggested and employed to prevent such accidental breaking and to minimize the damage and danger resulting therefrom, most of which are unsatisfactory in operation or complicated and expensive to manufacture.

The object of my invention is to simplify the construction and arrangement and reduce the cost of a guard or safety device particularly adapted for use in connection with the valves of ice-machines. To this end I employ the structure which will be hereinafter described, the novel features of which being more specifically pointed out in the appended claim.

Figure 2:
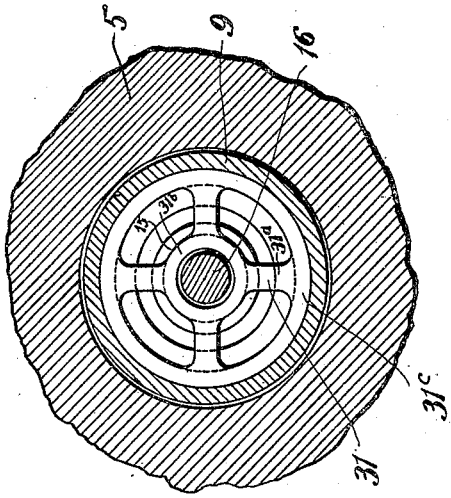
Figure 1:
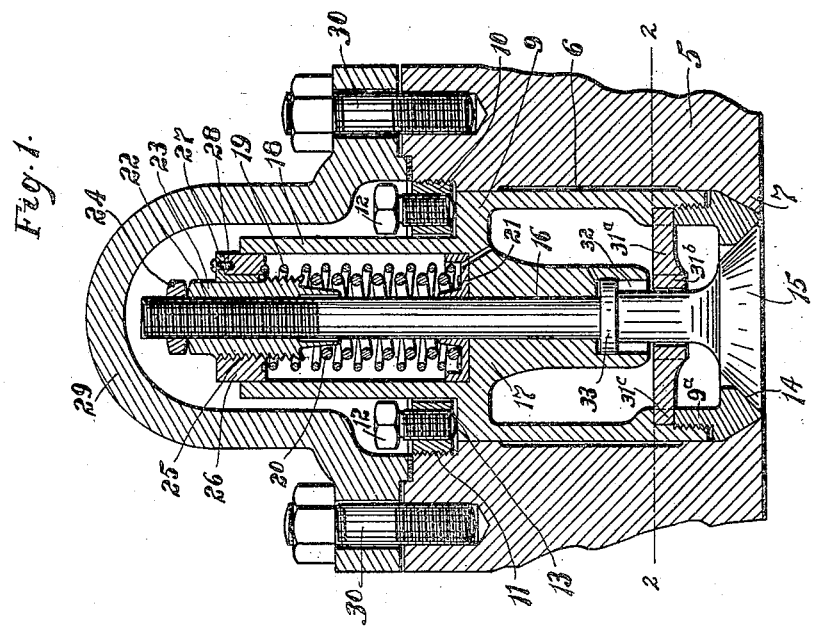

In the accompanying drawings, which illustrate the preferred embodiment of my invention, Figure 1 is a sectional elevation of a portion of a compressor-casing with the valve-housing in position therein, the valve being illustrated in elevation. Fig. 2 is a sectional plan view on the line 2 2 of Fig. 1.

Referring now to the drawings, the casing of the machine or compressor is indicated at 5 and has formed therein the passage-way 6, having the conical seat 7 at the inner end thereof. Against said seat rests the conical end of the valve-housing 9, which is securely fastened in position, so as to make a gas-tight joint at the seat 7. Said fastening means comprises the annular member 10, threaded into the casing 5 at 11 and carrying the independently-adjustable bolts 12, which rest against the shoulder 13 of said valve-housing and force said housing tightly against its seat 7. Such a construction admits of the application of considerable pressure directly downward upon the valve-housing.

The valve-housing 9 is provided at its inner end with the valve-seat 14, against which seats the valve-disk 15, carrying the spindle 16. The spindle is reciprocably mounted in and is guided by the diaphragm 17, formed integral with or otherwise rigidly attached to the valve-housing. Said diaphragm is formed with the cylindrical extension 18, containing the working spring 19 and the cushioning or buffer spring 20 and also the abutments with which said springs coact. Said springs both rest upon the lower abutment 21, which is fixed in the cylindrical extension 18. The outer end of the spindle is threaded at 22 to receive the nut 23, which acts as the movable abutment coacting with the cushioning-spring 20. This abutment 23 is adjustable upon the spindle and is locked in place by the jam-nut 24. The position of said abutment on the spindle fixes the point in the stroke of the valve at which the buffer-spring is called into play and therefore when adjusted varies the cushioning effect brought to bear upon said valve. The nut 23 is also threaded at 25 to receive the nut 26, which acts as the movable abutment for the working spring 19. The nut 26 can be adjusted relative to nut 23 and spindle 16 to vary the tension on the working spring. It will thus be seen that the tension on the working spring 19 and the cushioning action of spring 20 may be independently adjusted. The nut 26 is locked in position by means of the key 27, held in place by screw 28. The movable abutments carried by valve-spindle 16 reciprocate freely in the cylindrical extension which acts as a guide for same and as an additional guide for the valve-spindle. The arrangement just described is not claimed herein, as it forms the subject-matter of a copending application, Serial No. 271,953, filed July 31, 1905. The valve springs and housing are covered by the protecting-bonnet 29, fastened to the casing 5 by means of bolts 30.

Fixed in the valve-housing just above the valve-disk 15 and held in place by the annular member 9ª is a perforated guard-disk 31, which comprises the hub 31ᵇ, the radial arms 31ª, and the annular ring 31ᶜ, joining the outer ends of said arms. The valve-spindle 16 reciprocates through said hub 31ᵇ without making contact with the latter. Formed upon the valve-spindle 16 above the guard-disk 31 is a collar 33, which operates within a recess 32 in the lower end of the guiding-sleeve 17, producing a dash-pot action to aid the buffer-spring 20 in cushioning the movements of said valve. In case the valve spindle or springs should become injured or broken the valve would be prevented from falling into the compressor-cylinder by the engagement of the collar 33 with the guard-disk 31.

In the appended claim I aim to cover all modifications which do not involve a departure from the spirit and scope of the invention.

Having thus described my invention, what I claim as new, and desire to secure by Letters Patent, is—

In a gas-compressor, the combination with the casing, of a valve-housing therein containing a valve-seat, a valve-disk coöperating with said seat, a spindle attached to said valve-disk, said spindle having a collar formed thereon, a guiding-sleeve for said spindle, a guard for said valve-disk consisting of an independently-removable perforated disk separate from said guiding-sleeve and rigidly fastened in said housing just above said valve-disk, said spindle operating through an opening in the perforated disk, the opening being of smaller diameter than said collar and the latter being located just above the perforated disk, a protecting-bonnet, and means for fastening the valve-housing and valve-seat in position in the casing independently of said bonnet.

In testimony whereof I affix my signature in the presence of two witnesses.

FREDERICK W. FELSBERG.

Witnesses:
    EDW. MAULINIER,
    J. S. LOUIS.